(12) United States Patent
Park et al.

(10) Patent No.: US 9,542,405 B2
(45) Date of Patent: Jan. 10, 2017

(54) IMAGE PROCESSING SYSTEM AND METHOD

(71) Applicant: HANWHA TECHWIN CO., LTD., Changwon-si (KR)

(72) Inventors: Dongjun Park, Changwon-si (KR); Joonyoung Park, Changwon-si (KR); Yeongeol Ryu, Changwon-si (KR); Hakchul Shin, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 27 days.

(21) Appl. No.: 14/598,399

(22) Filed: Jan. 16, 2015

(65) Prior Publication Data
US 2015/0269143 A1 Sep. 24, 2015

(30) Foreign Application Priority Data
Mar. 21, 2014 (KR) ........................ 10-2014-0033671

(51) Int. Cl.
*G06F 17/30* (2006.01)

(52) U.S. Cl.
CPC ....... *G06F 17/301* (2013.01); *G06F 17/30274* (2013.01)

(58) Field of Classification Search
CPC .................... G06F 17/301; G06F 17/30274
See application file for complete search history.

(56) References Cited

U.S. PATENT DOCUMENTS

| | | | |
|---|---|---|---|
| 5,969,755 A * | 10/1999 | Courtney | G06F 17/3079 348/135 |
| 8,310,542 B2 | 11/2012 | Girgensohn et al. | |
| 2008/0046562 A1* | 2/2008 | Butler | G06F 17/3089 709/224 |
| 2009/0134968 A1* | 5/2009 | Girgensohn | G06K 9/00771 340/3.1 |
| 2009/0160859 A1* | 6/2009 | Horowitz | G06T 11/206 345/440 |
| 2009/0217315 A1* | 8/2009 | Malik | G06K 9/00362 725/9 |
| 2010/0039433 A1* | 2/2010 | McGreevy | G05B 23/0267 345/473 |
| 2010/0110183 A1* | 5/2010 | Bobbitt | G06K 9/3233 348/143 |

(Continued)

FOREIGN PATENT DOCUMENTS

| KR | 10-2011-0121324 A | 11/2011 |
|---|---|---|
| KR | 10-1176947 B1 | 8/2012 |
| KR | 10-2012-0105795 A | 9/2012 |

*Primary Examiner* — Sean Motsinger
(74) *Attorney, Agent, or Firm* — Sughrue Mion, PLLC (57) ABSTRACT

An image processing system and an image processing method. The image processing system includes: an image analysis engine configured to analyze an input image and generate metadata about the input image; an indexing engine configured to structuralize and organize the metadata and generate index data based on the metadata; a search engine configured to extract index data matching a search condition and image data corresponding to the index data matching the search condition, from the input image; and a browsing engine configured to generate a heatmap based on the extracted index data and image data and display the heatmap and an image matching the search condition on a screen.

17 Claims, 9 Drawing Sheets

(56) References Cited

U.S. PATENT DOCUMENTS

| | | | | |
|---|---|---|---|---|
| 2013/0166348 A1* | 6/2013 | Scotto | ................ | G06Q 30/0205 |
| | | | | 705/7.29 |
| 2013/0208784 A1* | 8/2013 | Pietil | .................... | H04N 19/137 |
| | | | | 375/240.02 |
| 2013/0230253 A1* | 9/2013 | Stankiewicz | ........ | G06K 9/4671 |
| | | | | 382/195 |
| 2013/0295952 A1* | 11/2013 | Chao | .................... | G01S 5/0236 |
| | | | | 455/456.1 |
| 2013/0300750 A1* | 11/2013 | Mishra | .................... | G06T 13/00 |
| | | | | 345/474 |
| 2014/0172489 A1* | 6/2014 | Goulart | ............ | G06Q 10/06312 |
| | | | | 705/7.22 |
| 2015/0117707 A1* | 4/2015 | Carceroni | ............. | G06T 7/2006 |
| | | | | 382/103 |
| 2015/0187102 A1* | 7/2015 | Park | ........................ | G06T 11/20 |
| | | | | 345/589 |
| 2015/0269143 A1* | 9/2015 | Park | .................. | G06F 17/30274 |
| | | | | 382/305 |
| 2015/0287214 A1* | 10/2015 | O'Gorman | ............ | G06T 7/2093 |
| | | | | 348/159 |
| 2015/0310370 A1* | 10/2015 | Burry | ................. | G06K 9/00785 |
| | | | | 705/7.26 |
| 2016/0021333 A1* | 1/2016 | Lim | ....................... | H04N 5/765 |
| | | | | 386/248 |

* cited by examiner

|   |   |   |   |   |   |   |   |   |   |
|---|---|---|---|---|---|---|---|---|---|
| 0 | 0 | 5 | 2 | 2 | 3 | 3 | 0 | 0 | 0 |
| 0 | 0 | 4 | 2 | 10 | 3 | 3 | 0 | 0 | 0 |
| 0 | 3 | 12 | 12 | 12 | 12 | 10 | 12 | 10 | 0 |
| 0 | 3 | 15 | 20 | 20 | 20 | 20 | 20 | 3 | 0 |
| 0 | 12 | 20 | 30 | 24 | 30 | 30 | 20 | 3 | 0 |
| 0 | 3 | 20 | 30 | 20 | 24 | 20 | 12 | 12 | 0 |
| 0 | 3 | 20 | 20 | 20 | 20 | 20 | 12 | 10 | 0 |
| 0 | 10 | 12 | 12 | 12 | 12 | 20 | 12 | 10 | 0 |
| 0 | 0 | 3 | 10 | 4 | 0 | 0 | 4 | 0 | 0 |
| 0 | 0 | 0 | 0 | 2 | 3 | 2 | 0 | 0 | 0 |

FIG. 4B

■ : RED
▓ : ORANGE
░ : GREEN
▒ : SKY BLUE
▓ : BLUE

IMAGE PROCESSING SYSTEM AND METHOD

CROSS-REFERENCE TO THE RELATED APPLICATION

This application claims priority from Korean Patent Application No. 10-2014-0033671, filed on Mar. 21, 2014, in the Korean Intellectual Property Office, the disclosure of which is incorporated herein in its entirety by reference.

BACKGROUND

1. Field

Apparatuses and methods consistent with exemplary embodiments relate to an image processing system and method.

2. Description of the Related Art

A heatmap is used in various image monitoring systems by using an effective browsing method. The heatmap is a graphical representation of data by which various pieces of information are presented in various colors on an image as visual graphics in a heat distribution form. The heatmap may present interests of customers or complexity in different color levels on a camera image or a map. The heatmap presents a high motion region in a red color and presents a low motion region in a blue color in consideration of visibility.

The heatmap involves a method of displaying a search result with respect to a motion amount, which prioritizes user convenience. However, this method still does not provide a sufficient visibility.

SUMMARY

Exemplary embodiments of the inventive concept provide an image processing system and method capable of increasing visibility when a heatmap of an image corresponding to a user search condition is generated.

Various aspects of the exemplary embodiments will be set forth in part in the description which follows and, in part, will be apparent from the description, or may be learned by practice of the presented embodiments.

According to an exemplary embodiment, there is provided an image processing system which may include: an image analysis engine configured to analyze an input image and generate metadata about the input image; an indexing engine configured to structuralize and organize the metadata and generate index data based on the metadata; a search engine configured to extract index data matching a search condition and image data corresponding to the index data matching the search condition, from the input image; and a browsing engine configured to generate a heatmap based on the extracted index data and image data and display the heatmap and an image matching the search condition on a screen.

The image analysis engine may classify objects included in the input image and analyze motions of the objects and lines of movement.

The image analysis engine may cumulate and process a result of analyzing the motions of the objects per unit time.

The browsing engine may divide a region of the input image matching the search condition into predetermined units, calculate an amount of motions in divided regions from the index data to establish priorities, allocate different indications (e.g., colors) according to the established priorities to generate the heatmap, and apply smoothing filtering to the heatmap to reconfigure the heatmap.

The browsing engine may generate the heatmap by connecting regions of the heatmap having a same indication and processing contour lines on the connected regions.

The browsing engine may perform overlapping one of the image matching the search condition and the reconfigured heatmap on the other.

If a point is selected on the reconfigured heatmap, the browsing engine may provide a summarized image corresponding to the selected point.

The browsing engine may display the reconfigured heatmap, the image matching the search condition and the summarized image, on different regions of the screen.

According to another exemplary embodiment, there is provided an image processing system which may include: a heatmap generator configured to divide a region of an image matching a search condition into predetermined units, calculate an amount of motions in divided regions from index data to establish priorities, allocate different indications (e.g., colors) according to the established priorities to generate a heatmap, and apply smoothing filtering to the heatmap to reconfigure the heatmap; and a display unit configured to display the reconfigured heatmap and the image matching the search condition.

The heatmap generator may generate the heatmap by connecting regions of the heatmap having a same indication and process contour lines on the connected regions.

The heatmap generator may include: an overlapper configured to overlap one of the image matching the search condition and the reconfigured heatmap on the other.

The heatmap generator may include: a summarized image generator, if an arbitrary point is selected on the reconfigured heatmap, configured to generate a summarized image corresponding to the selected point.

The display unit may display the reconfigured heatmap, the image matching the search condition and the summarized image, on different regions of the screen.

According to still another exemplary embodiment, there is provided an image processing method which may include: analyzing an input image and generating metadata about the input image; structuralizing and organizing the metadata and generating index data based on the metadata; extracting index data matching a search condition and image data corresponding to the index data matching the search condition, from the input image; and generating a heatmap based on the extracted index data and image data, and displaying the heatmap and an image matching the search condition on a screen.

The analyzing of the input image includes: classifying objects included in the input image and analyzing motions of the objects and lines of movement; and cumulating and processing a result of analyzing motions of the objects per unit time.

The generating of the heatmap may include: dividing a region of an image matching a search condition into predetermined units; calculating an amount of motions in the divided regions from index data to establish priorities; allocating different indications according to the established priorities to generate a heatmap; and applying smoothing filtering to the heatmap to reconfigure the heatmap.

The image processing method may further include generating the heatmap by connecting regions of the heatmap having a same indication and processing contour lines on the connected regions.

The image processing method may further include overlapping one of the image matching the search condition and the reconfigured heatmap on the other.

The image processing method may further include, if a point is selected on the reconfigured heatmap, generating a summarized image corresponding to the selected point.

According to still another exemplary embodiment, there is provided a non-transitory computer-readable recording medium having recorded thereon a computer program for executing an image processing method. The method may include: analyzing an input image and generating metadata about the input image; structuralizing and organizing the metadata and generating index data based on the metadata; extracting index data matching a search condition and image data corresponding to the index data matching the search condition, from the input image; and generating a heatmap based on the extracted index data and image data, and displaying the heatmap and an image matching the search condition on a screen.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION OF THE EXEMPLARY EMBODIMENTS

Reference will now be made in detail to exemplary embodiments, which are illustrated in the accompanying drawings, wherein like reference numerals refer to like elements throughout. In this regard, these embodiments may have different forms and should not be construed as being limited to the descriptions set forth herein. Accordingly, these embodiments are merely described below, by referring to the figures, to explain aspects of the inventive concept. As used herein, the term "and/or" includes any and all combinations of one or more of the associated listed items. Hereinafter, various exemplary embodiments will be described with reference to the accompanying drawings. In the following description, a detailed description of known functions and configurations incorporated herein will be omitted when it may obscure the subject matter of the embodiments.

The terminology used herein is for the purpose of describing exemplary embodiments only and is not intended to be limiting. As used herein, the singular forms are intended to include plural forms as well, unless the context clearly indicates otherwise. It will be further understood that the terms "comprises" and/or "has" when used herein, specify the presence of a stated feature, number, step, operation, component, element, or a combination thereof but do not preclude the presence or addition of additional features, numbers, steps, operations, components, elements, or combinations thereof. Although ordinal numbers such as "first," "second," and so forth will be used to describe various components, those components are not limited by the terms. The ordinal terms are used only for distinguishing one component from another component.

Figure 1:
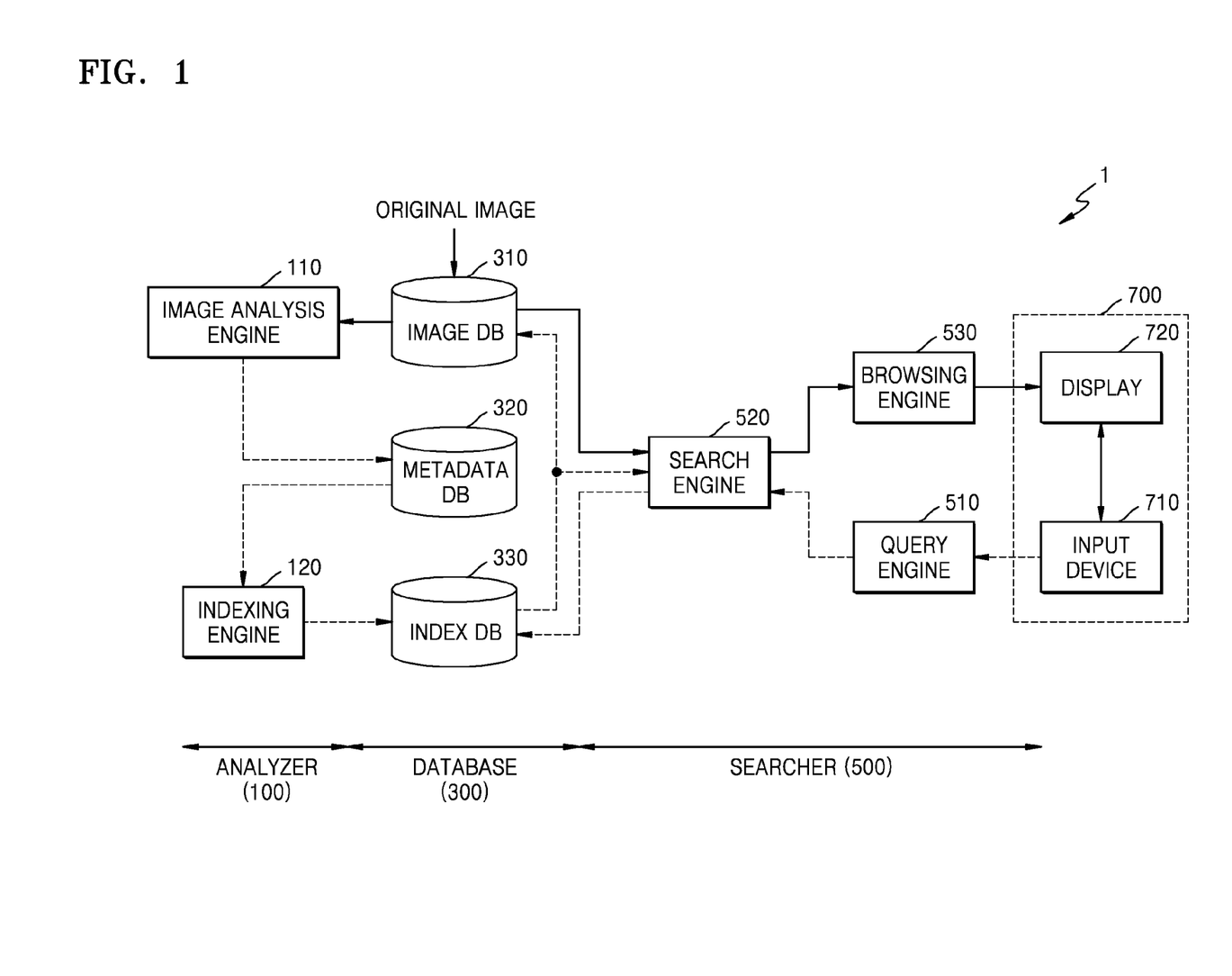
FIG. 1 is a block diagram illustrating an image processing system, according to an exemplary embodiment.

FIG. 1 is a block diagram illustrating an image processing system 1 according to an exemplary embodiment. Referring to FIG. 1, the image processing system 1 includes an analyzer 100, a database 300, and a searcher 500.

The analyzer 100 analyzes an input original image based on ontology, and stores a result of the analysis in the form of metadata. The analyzer 100 includes an image analysis engine 110 and an indexing engine 120.

The image analysis engine 110 analyzes the original image, classifies the original image according to a predefined category, and extracts attributes of an object detected from the original image, for example, a type, a color, a size, a form, a motion, and a trajectory of the object. A category may be a search condition that a user inputs to be provided with a desired result. That is, according to an exemplary embodiment, a category and a search condition defined in the image processing system 1 are mutually dependent on each other, and if a category is added, the search conditions to be selected are also extended. The image processing system 1 defines meanings of categories and a relationship between the categories to accurately define a category of details to be analyzed.

The image analysis engine 110 performs image analysis, such as sensing an appearance and disappearance of an object, sensing a motion of the object in the original image. The image analysis engine 110 performs background region detection, foreground and object detection, object counting, camera tampering detection, and face detection. The image analysis engine 110 calculates brightness, color, texture, and shape information of the image.

Moreover, the image analysis engine 110 generates an event if a result of the image analysis satisfies an event generation condition. Herein, the event may include a system event that is set in a system, such as when a network error occurs or a new camera (not shown) is set. The event may also include a user event set by the user, such as appearance of an object, generation of an image specified by the user (for example, generation of a face that cannot be recognized), a change in screen color, or occurrence of a motion in a preset region of an input image, and generation of an abnormal sound source (for example, a frictional sound of a vehicle's tire (skid), a glass-breaking sound, an alarm sound, an impact sound, and the like), generation of a user-specified sound source (for example, a shout, a scream, a cry, and the like), or generation of a voice having a pitch greater than a threshold value for a sound source.

Figure 2:
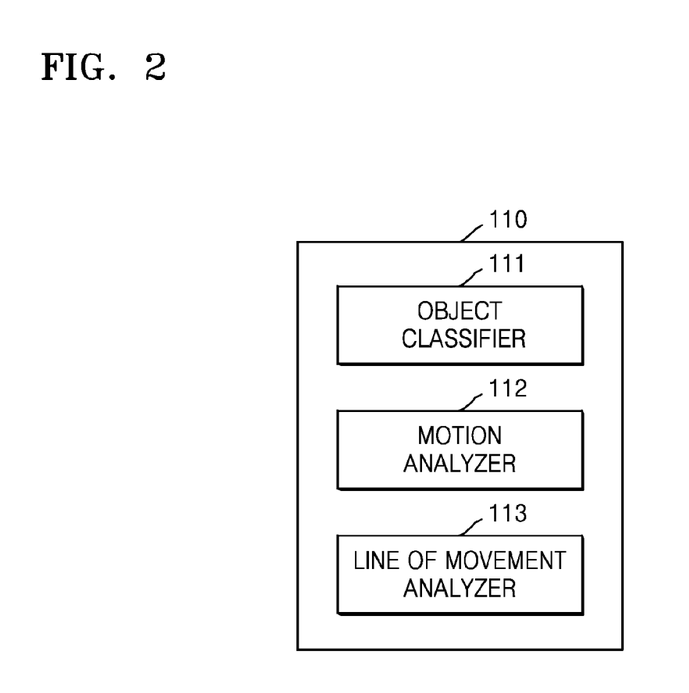
FIG. 2 is a detailed block diagram illustrating an image analysis engine, according to an exemplary embodiment.

FIG. 2 is a detailed block diagram illustrating the image analysis engine 110 according to an exemplary embodiment. Referring to FIG. 2, the image analysis engine 110 may include an object classifier 111, a motion analyzer 112, and a line of movement analyzer 113.

The object classifier 111 classifies objects included in an original image such as humans, vehicles, animals, etc.

The motion analyzer 112 analyzes motions of the classified objects, in particular, an occurrence frequency of the objects and a variation of the occurrence frequency within a given time period (for example, hours, days, months, etc.). To quickly determine a motion occurrence frequency of the objects within the given time period, the motion analyzer 112 performs cumulative hashing. This means that the motion occurrence frequency input for each time unit, i.e. an amount of motions, includes a sum of an amount of motions up to a previous time. Assuming that $M_n$ denotes a motion occurrence frequency for a time n, and $H_n$ denotes an actually input motion occurrence frequency, equation 1 below is established.

$$H_n = M_n + \sum_{0}^{k-1} M_k \qquad \text{[Equation 1]}$$

According to equation 1 above, a sum of motion occurrence frequencies between a given time period is a difference in the motion occurrence frequency between two time periods. That is, if a user requests a motion occurrence frequency between time points of t2 and t1 (t2>t1), the motion occurrence frequency $M_d$ within a time period from t1 to t2 is given by equation 2 below.

$$M_d = M_{t2} - M_{t1} \qquad \text{[Equation 2]}$$

There is an advantage of using the cumulative hashing in that it takes a predetermined period of time to calculate the motion occurrence frequency although the user requests a search for a very long time period.

The line of movement analyzer 113 analyzes a line of movement of an object by detecting and tracking a motion of the object. The line of movement analyzer 113 detects the motion of the object from the input original image, generates line of movement information by tracking a trajectory based on a similarity between frames, and removes noise for analyzing a pattern of the generated line of movement information. Thereafter, the line of movement analyzer 113 groups similar line of movement information from which noise is removed. To group the similar line of movement information, the line of movement analyzer 113 may apply a topic modeling algorithm, and generate a spatial probabilistic model of the line of movement by using the topic modeling algorithm. The line of movement analyzer 113 may provide a result of performing artificial intelligence neural network learning and grouping the similar line of movement information as a line of movement analysis result.

According to another exemplary embodiment, the line of movement analyzer 113 detects a motion of an object from the input original image, generates line of movement information by tracking a trajectory through a similarity between frames, and removes noise for analyzing a pattern of the generated line of movement information. The line of movement analyzer 113 selects certain points included in the line of movement information from which noise is removed. Here, a selection condition may be selecting a point where there is a large change, i.e. a large direction change. For example, a start point included in the line of movement information, an end point, and a certain point having the large direction change may be selected. The line of movement analyzer 113 may provide a result of grouping similar line of movement information including the points as a line of movement analysis result.

An image analysis result of the image analysis engine 110 as described above is stored in a metadata database 320 in the form of metadata. In this regard, in addition to text based metadata, image-based metadata such as a blob image in a motion region and a background model may also be stored in the metadata database 320.

To facilitate a search, the indexing engine 120 structuralizes and arranges the metadata stored in the metadata database 320, generates index data, and stores the index data in an index database 330.

The searcher 500 generates and provides information that matches a search condition input by the user. The searcher 500 may include a query engine 510, a search engine 520, and a browsing engine 530.

The query engine 510 receives the search condition from the user through an input device 710, and analyzes the user's requirements from the search condition, and reconfigures the user's requirements in a predefined form. For example, the user may input a time period, a camera channel number, an object classification category (a person, a vehicle, or the like), through the input device 710.

The search engine 520 extracts index data that matches the reconfigured search condition from the index database 330, and extracts image data corresponding to the extracted index data from an image database 310.

Figure 3:
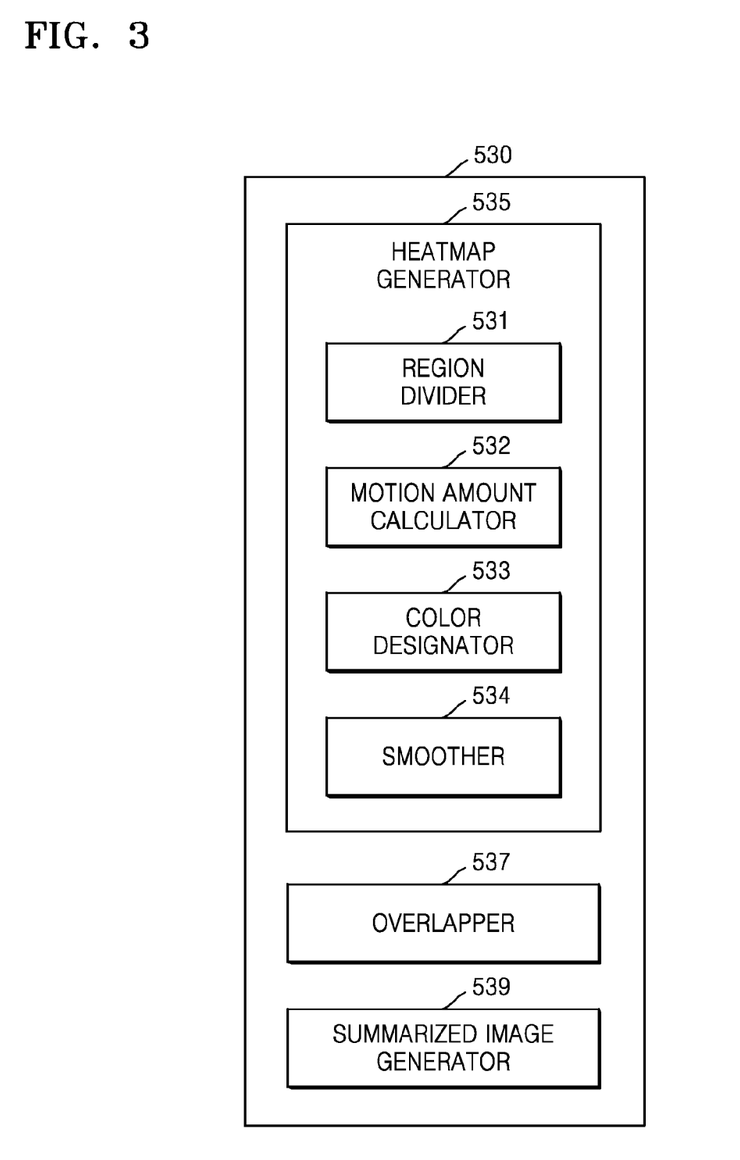
FIG. 3 is a detailed block diagram illustrating a browsing engine, according to an exemplary embodiment.

The browsing engine 530 generates and outputs a heatmap based on the extracted index data and image data to the display unit 720. FIG. 3 is a detailed block diagram illustrating the browsing engine 530 according to an exemplary embodiment. Referring to FIG. 3, the browsing engine 530 may include a heatmap generator 535 including a region divider 531, a motion amount calculator 532, a color designator 533, and a smoother 534. The browsing engine may also include an overlapper 537 and a summarized image generator 539.

Figure 4A:
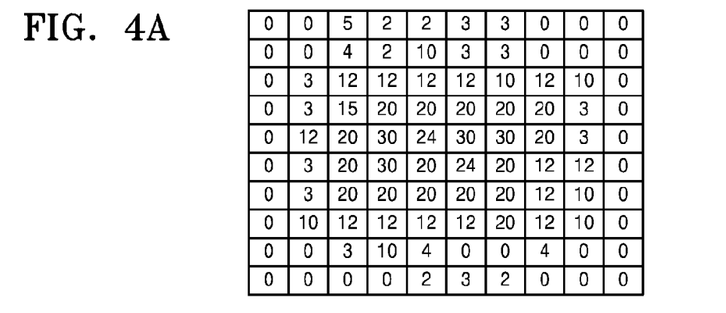
FIGS. 4A through 4D are diagrams for explaining heatmaps generated by the browsing engine, according to exemplary embodiments.

Regarding the heatmap generator 535, the region divider 531 divides an image that matches a search condition into predetermined units. The region divider 531 may variously divide a region according to settings, for example, 5×5, 10×10, 20×20, etc. FIG. 4A shows an example of an image that is divided into 10×10 regions.

The motion amount calculator 532 calculates an amount of motions of divided regions from the index data. The motion amount calculator 532 may extract a motion analysis result of a time or time period, which is input as the search condition, as the index data through the search engine 520, match the index data to the divided regions, and calculate the amount of motions. In this regard, the index database 330 stores the index data according to the motion analysis result to which cumulative hashing is applied. Thus, if a user requests the motion occurrence frequency between t1 and t2 (t2>t1) which is the time period that is input through the query engine 510, the search engine 520 may extract a difference in the motion occurrence frequency between two time periods as index data from the index database 330, and the motion amount calculator 532 may apply the index data to the divided regions to calculate the amount of motions. FIG. 4A shows an example of an amount of motions, i.e. the motion occurrence frequency, of a predetermined time period that is cumulated and displayed in each of the 10×10 divided regions. In this regard, a numerical value recorded on each region indicates the amount of motions, and means that the greater the numerical value, the higher the motion occurrence frequency.

Figure 4B:
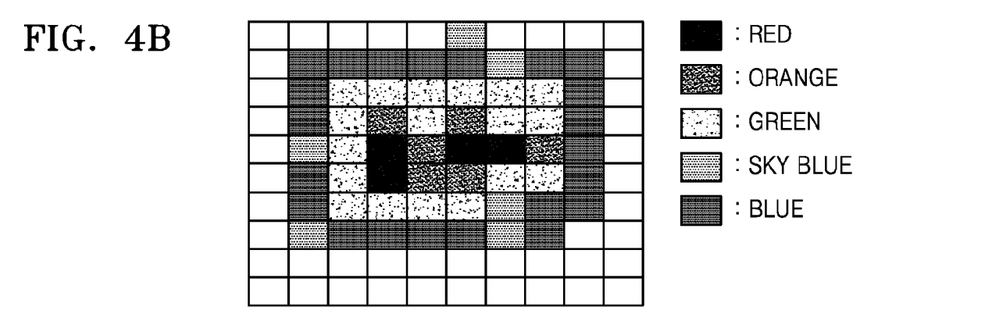

The color designator 533 establishes a priority from each region in which the motion occurrence frequency is cumulated, and then allocates and displays different colors according to the established priority, thereby generating a heatmap. In more detail, with regard to the generation of the heatmap, if color units that are to be allocated are, for example, eight (8), first through eighth priorities may be established with respect to the motion occurrence frequency of the divided regions, a first color, for example, red, may be allocated to the first priority, a second color, for example, blue, may be allocated to the eighth priority, and a color changing from red to blue may be allocated to the second through seventh priorities. Another method is that a maximum value having the largest motion occurrence frequency and a minimum value having the smallest motion occurrence frequency in the divided regions may be established, the first color may be allocated to the maximum value, and the second color may be allocated to the minimum value. A region between the maximum value and the minimum value may be uniformly divided or a weight may be applied to a specific frequency so that a red based color different from the first color may be applied to the divided region closer to the maximum value, and a blue based color different from the second color may be applied to the divided region closer to the minimum value. FIG. 4B shows a heatmap generation result with respect to FIG. 4A that shows the cumulated and displayed amount of motions.

Figure 4C:
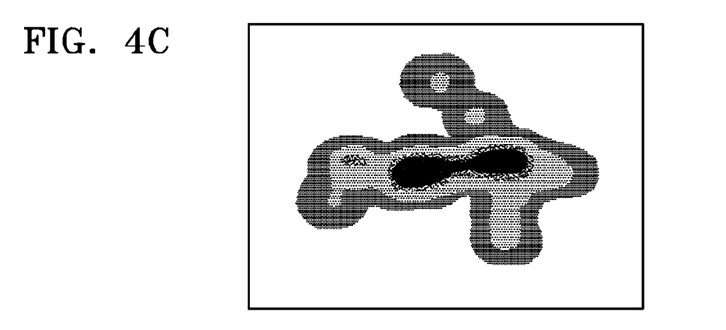

The heatmap generation result of FIGS. 4A and 4B exhibits deteriorated visibility, and thus the smoother 534 reconfigures the heatmap by applying smoothing filtering to the heatmap generation result. In this regard, the smoothing filtering means reconfiguring a smoother heatmap by applying a Gaussian filter, a median filter, a bilateral filter, or a mean filter to the heatmap generation result. For example, the heatmap is reconfigured to have a continuous value by applying Gaussian filtering to the heatmap. That is, a motion that occurs in a specific block influences and is applied to a periphery of the block. FIG. 4C shows an example of a heatmap reconfigured to be smoothly displayed by applying smoothing filtering to the heatmap of FIG. 4B.

As another exemplary embodiment, the heatmap may be reconfigured by connecting regions having the same color in the heatmap generation result and processing contour lines on the connected regions.

The heatmap reconfigured by applying smoothing filtering or processing contour lines as described above may provide an intuitive result so that a user may more easily understand an entire trend of a motion distribution.

Figure 4D:
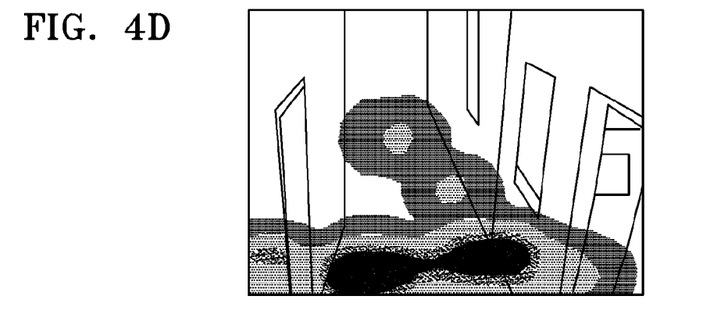

The overlapper 537 may overlap and display the reconfigured heatmap generation result and a corresponding image. Such overlapping may enable the user to more easily determine a region of an image in which a motion frequently occurs, and may be used to analyze a spatial motion. FIG. 4D shows an example of overlapping the reconfigured heatmap generation result and the corresponding image.

If a point on the reconfigured heatmap is selected, the summarized image generator 539 may generate a summarized image corresponding to the selected point, and may provide the reconfigured heatmap and the summarized image together. The summarized image generator 539 may generate the summarized image based on a time period or an object. When the summarized image is generated based on the time period, a period having no moving object may be removed and an image may be reconfigured. When the summarized image is generated based on an object, an object of an original image may be present in a completely different section in the summarized image. That is, the summarized image may be generated by calculating and reconfiguring an object appearance period for the summarized image.

The database 300 stores an original image and an image analysis result. The database 300 may include an image database 310, a metadata database 320, and an index database 330.

The original image may be an image that is directly transmitted from a camera (not illustrated) which is an image sensor connected to an image search system 1, may be an image stored in a digital image recorder (DVR) or a network image recorder (NVR) connected to the image search system 1, or may be an image input through various paths over a network (not illustrated).

The original image in the form of a data stream input to the image search system 1 is stored in the image database 310.

The analysis result of the original image is stored in the form of text-based metadata in the metadata database 320. The metadata database 320 stores image-based metadata that is a part of the original image, for example, a blob image of a motion-detected object and a background model.

A user terminal 700 is used by a user or a security official who manages the image search system 1, and may be a personal computer (PC) or a mobile terminal. The user may control the image search system 1 through the user terminal 700. The user terminal 700 includes the input device 710 that is a user interface capable of inputting a query (search condition) to the image search system 1.

The input device 710 is connected by wire or wirelessly with the image search system 1 such that the user generates input data for controlling an operation of the image search system 1. The input device 710 may be a keypad, a dome switch, a touch pad (of a contact-type capacitive type, a pressure-type resistive type, an infrared sensing type, a surface ultrasonic conduction type, an integral tension measurement type, a piezoelectric effect type, or the like), a mouse, a remote controller, a jog wheel, or a jog switch. The user terminal 700 sets a display condition of generating a heatmap by modifying, adding or deleting the search condition with the input device 710.

The user terminal 700 displays the summarized image matching the search condition on the display unit 720.

The display unit 720 provides the heatmap output from the browsing engine 530 to the user, allowing the user to monitor the displayed image. The display unit 720 displays a menu item for a user's direct or indirect selection of a search condition such as a change in the heatmap or in overlapping of the heatmap and an image, a classification category of objects for generating the heatmap, a time period, a camera channel, etc. The search condition may be extended by cooperating with a category set in the image analysis engine 110.

Figure 5:
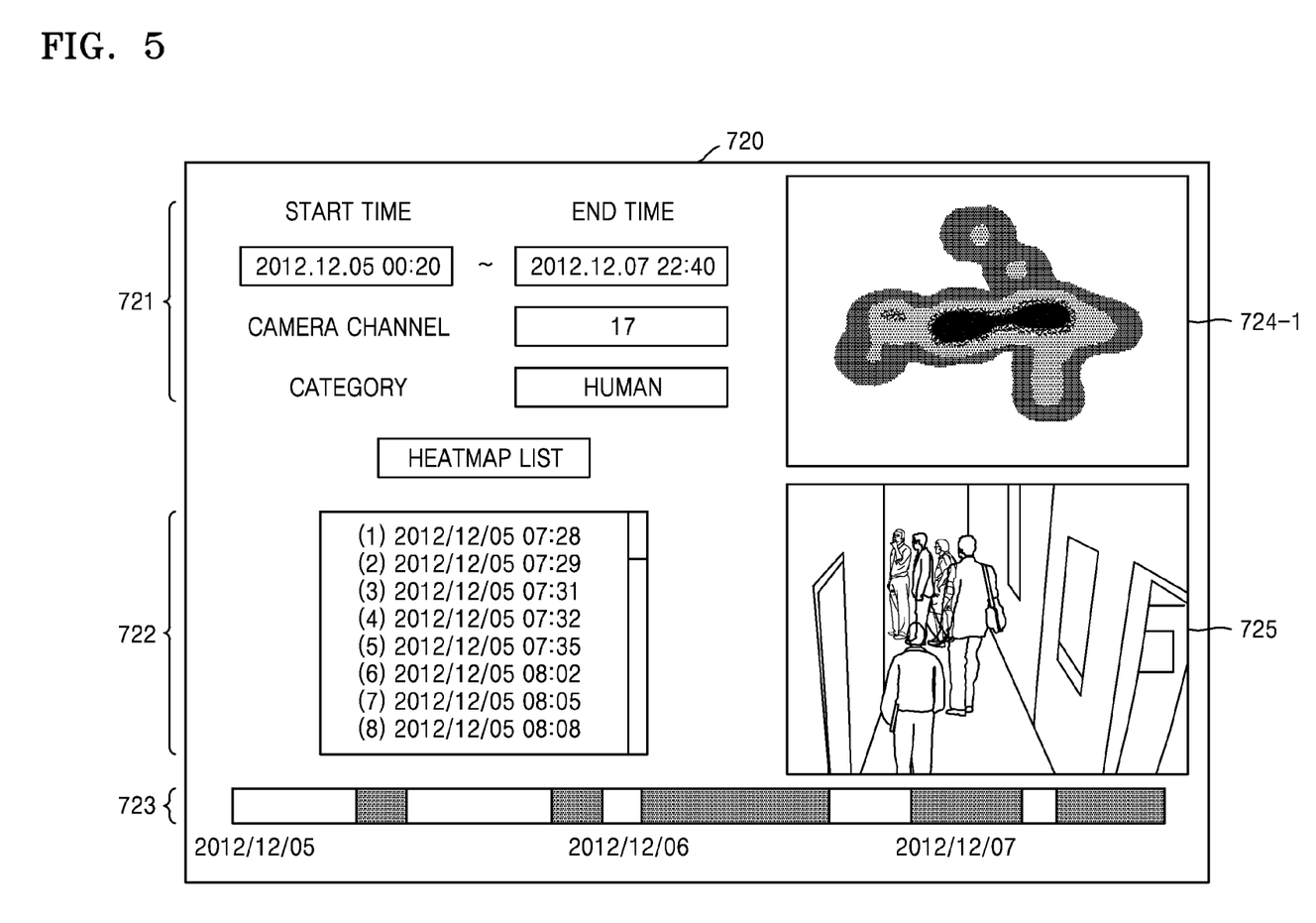
FIGS. 5 through 7 are diagrams of a heatmap generation result according to a user search condition, according to exemplary embodiments.
Figure 6:
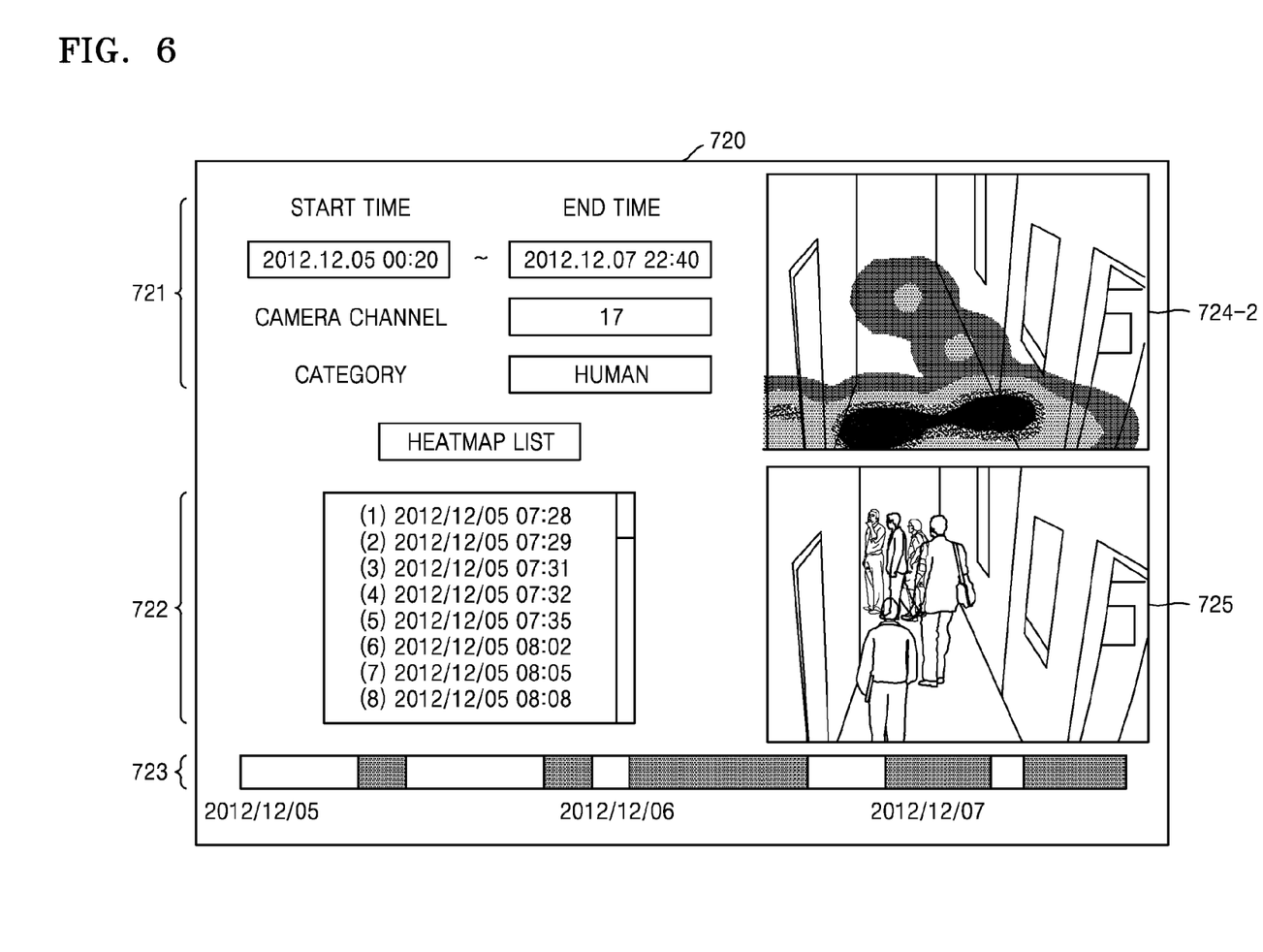
Figure 7:
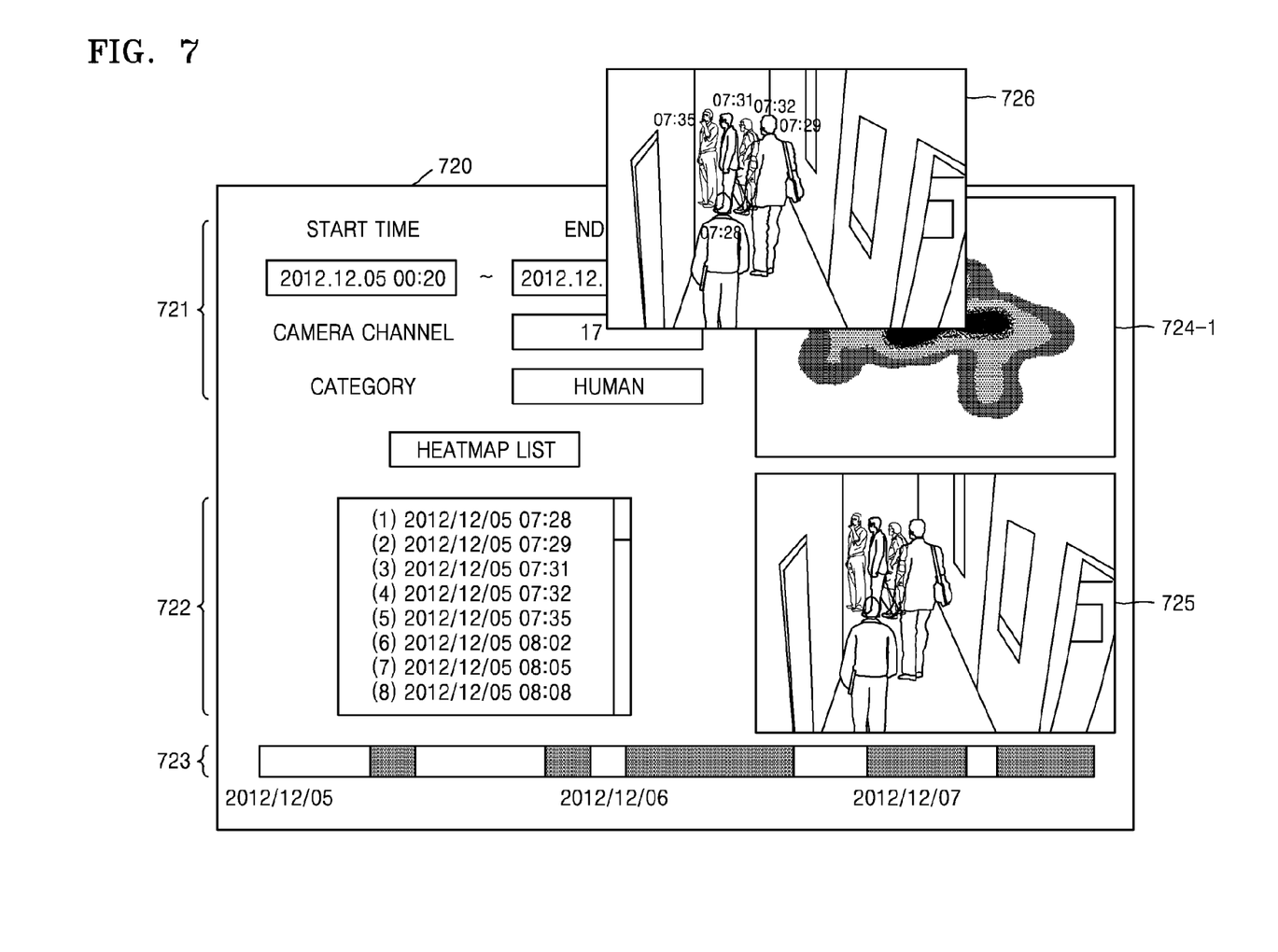

FIGS. 5 through 7 are diagrams of a heatmap generation result according to a user search condition, according to exemplary embodiments.

Referring to FIG. 5, the display unit 720 may include a search condition region 721 for selecting a search condition such as a time period for generating a heatmap, i.e. a start time and an end time, a camera channel, and a subject classification category, a heatmap list region 722 generated according to a detection of a motion in a unit time period between the start time and the end time, a time axis display region 723 for indicating a time, a reconfigured heatmap display region 724-1, and a reproduction image display region 725 of a time period designated by a user.

Referring to FIG. 6, the display unit 720 may include the search condition region 721 that selects a search condition such as a time period for generating a heatmap, i.e. a start time and an end time, a camera channel, and a subject classification category, the heatmap list region 722 generated according to a detection of a motion in a unit time period between the start time and the end time, the time axis display region 723 indicating a time, the region in which an image and a reconfigured heatmap overlap and are displayed 724-2, and the reproduction image display region 725 of a time period designated by a user.

Referring to FIG. 7, the display unit 720 may include the search condition region 721 for selecting a search condition such as a time period for generating a heatmap, i.e. a start time and an end time, a camera channel, and a subject classification category, the heatmap list region 722 generated according to a detection of a motion in a unit time period between the start time and the end time, the time axis display region 723 indicating a time, the reconfigured heatmap display region 724-1, the reproduction image display region 725 of a time period designated by a user, and a summarized image display region 726.

The display unit 720 may provide visual information and/or audible information to the user. The display device 720 may include a liquid crystal display (LCD) panel, an organic light emitting display (OLED) panel, or an electrophoretic display (EPD) panel. The display device 720 may be provided in the form of a touchscreen to receive an input through a user's touch and may operate as an input interface.

An image processing method according to exemplary embodiments will now be described with reference to FIGS. 8 and 9 below. The image processing method according to the present embodiments may be performed by the image processing system 1 with the assistance of peripheral components of FIG. 1. Redundant descriptions between FIGS. 8 and 9 and FIGS. 1 through 7 are omitted below.

Figure 8:
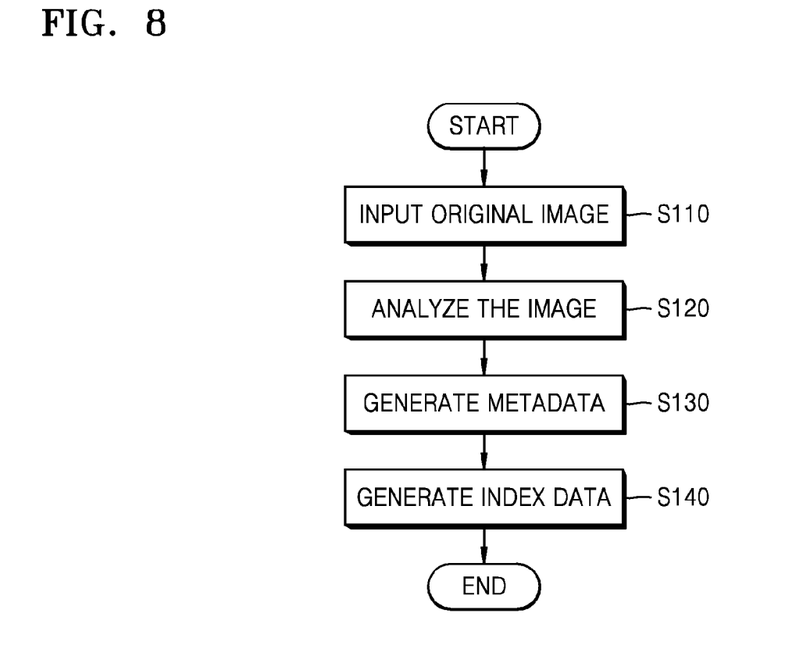
FIG. 8 is a flowchart illustrating an image processing method performed by an image processing system, according to an exemplary embodiment.
Figure 9:
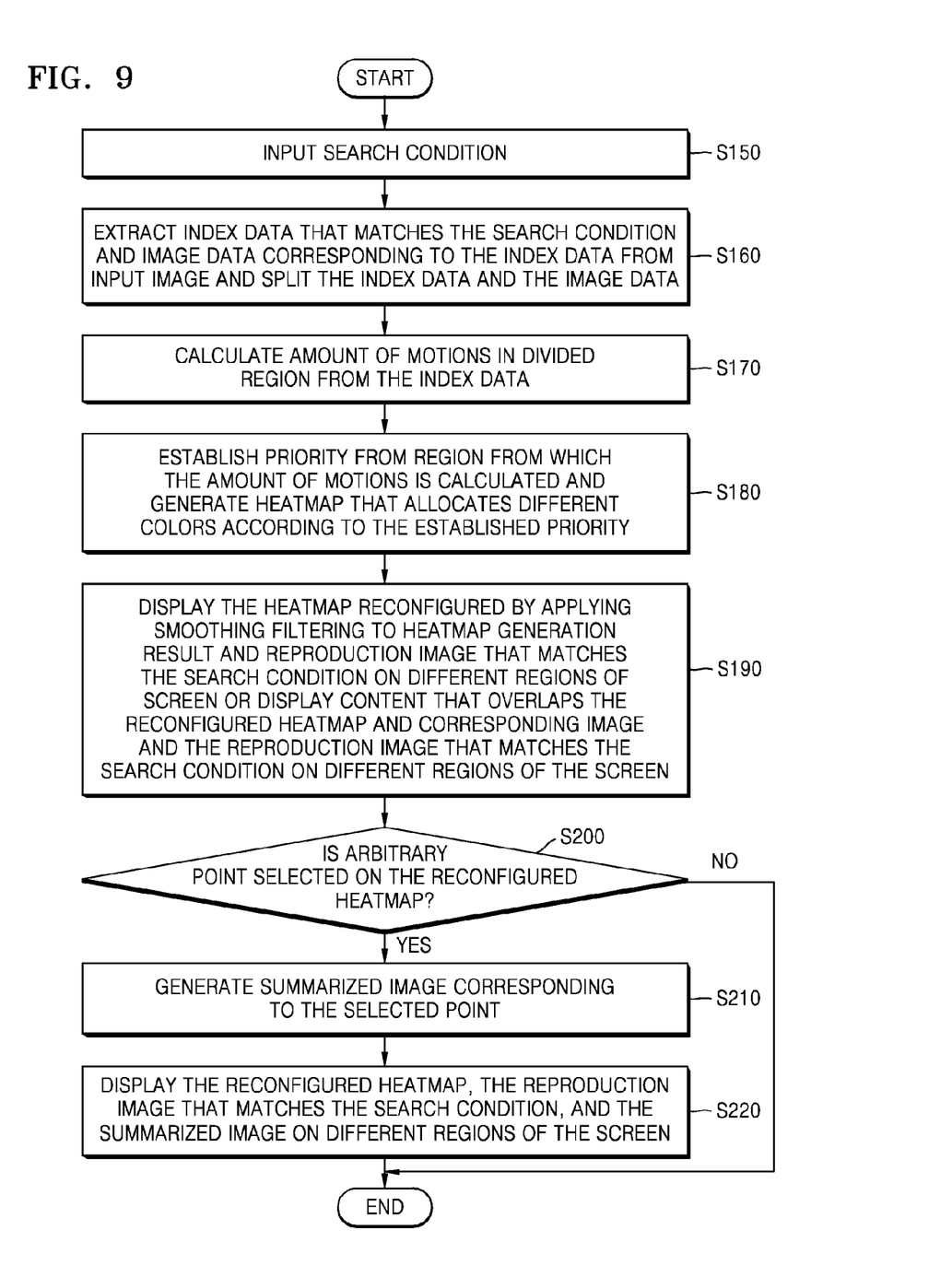
FIG. 9 is a flowchart illustrating a method of generating and displaying a heatmap performed by an image processing system, according to an exemplary embodiment.

FIG. 8 is a flowchart illustrating an image processing method performed by an image processing system, according to an exemplary embodiment.

Referring to FIG. 8, if an original image is input (operation S110), the image processing system analyzes the original image by using a classification and analysis module (operation S120). The image processing system may analyze the original image according to a previously defined category. The category may link with a search condition. The search condition may be established and extended according to the defined category.

The image processing system generates and stores metadata that is an analysis result of the original image (operation S130). The metadata may include image-based metadata such as a blob image in a motion region and a background model, in addition to text based metadata.

The image processing system generates and stores index data by structuralizing and organizing the metadata to facilitate a search (operation S140).

FIG. 9 is a flowchart illustrating a method of generating and displaying a heatmap performed by an image processing system, according to an exemplary embodiment.

Referring to FIG. 9, if a user inputs a search condition (operation S150), the image processing system extracts index data that matches the search condition and image data corresponding to the index data from an input image, and divides the index data and the image data (operation S160).

The image processing system calculates an amount of motions in a divided region from the index data (operation S170). The image processing system may extract a motion analysis result of a time that is input as the search condition as the index data, match the index data to the divided region, and calculate the amount of motions (a motion occurrence frequency). In this regard, an index database stores the index data according to the motion analysis result to which cumulative hashing is applied. Thus, with respect to a time period t2 to t1 (t2>t1) that is input by a user, the image processing system may extract a difference in the amount of motions between two time periods from the index database, correspond the index data to the divided region, and calculate the amount of motions.

The image processing system may establish a priority from a region where the amount of motions is calculated, and generate a heatmap that allocates different colors according to the established priority (operation S180).

The image processing system displays the heatmap reconfigured by applying smoothing filtering to a heatmap generation result and a reproduction image that matches the search condition on different regions of a screen or displays content that overlaps the reconfigured heatmap and a corresponding image, and the reproduction image that matches the search condition on different regions of the screen (operation S190). As another exemplary embodiment, the image processing system may display the reconfigured heatmap by connecting regions having the same color in the heatmap generation result and processing contour lines on the connected regions and the reproduction image that matches the search condition on different regions of the screen or may display content that overlaps the reconfigured heatmap by processing contour lines on the connected regions and a corresponding image and the reproduction image that matches the search condition on different regions of the screen. The heatmap reconfigured by applying smoothing filtering or processing contour lines described above may provide an intuitive result that the user may more easily understand an entire trend of a motion distribution.

The image processing system determines whether the user selects a point on the reconfigured heatmap (operation S200), and, when a point is selected on the reconfigured heatmap, generates a summarized image corresponding to the selected point (operation S210).

The image processing system displays the reconfigured heatmap, the reproduction image that matches the search condition, and the summarized image on different regions of the screen (operation S220).

As described above, according to the exemplary embodiments, a user may easily understand a result of a search condition from a heatmap having an increased visibility generated based on the search condition.

According to exemplary embodiments, the methods described above in reference to FIGS. 8 and 9 may be realized as a program code which is executable by a computer, and the program code may be stored in various non-transitory computer readable media and provided to each device so as to be executed by a processor. For example, there may be provided a non-transitory computer readable medium in which a program for providing a different user interaction function to the first area where the transparent display is overlapped with the first body and the second area which is the remaining part of the transparent display is stored in response to the second body being slid from the first body to open the first body. The non-transitory computer readable medium refers to a medium which may store data semi-permanently rather than storing data for a short time such as a register, a cache, and a memory and may be readable by an apparatus. Specifically, the above-described various applications or programs may be stored and provided in a non-transitory recordable medium such as compact disc (CD), digital versatile disk (DVD), hard disk, Blu-ray disk, universal serial bus (USB), memory card, read-only memory (ROM), etc.

At least one of the components, elements or units represented by a block as illustrated in FIGS. 1-3 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Also, the steps of all methods described herein can be performed in any suitable order unless otherwise indicated herein or otherwise clearly contradicted by context. The present inventive concept is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope of the inventive concept.

It should be understood that the exemplary embodiments described herein should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. An image processing system comprising at least one hardware processor to implement:
   an image analysis engine configured to analyze an input image and generate metadata about the input image;
   an indexing engine configured to structuralize and organize the metadata and generate index data based on the metadata;
   a search engine configured to extract index data matching a search condition and image data corresponding to the index data matching the search condition, from the input image; and
   a browsing engine configured to generate a heatmap based on the extracted index data and image data and display the heatmap and an image matching the search condition on a screen,
   wherein the image analysis engine is configured to classify objects included in the input image, analyze motions or lines of movement of the objects, and perform cumulative hashing on a result of analyzing the motions of the objects per unit time.

2. The image processing system of claim 1, wherein the browsing engine is configured to divide a region of the input image matching the search condition into predetermined units, calculate an amount of motions in divided regions from the index data to establish priorities, allocate different indications according to the established priorities to generate the heatmap, and apply smoothing filtering to the heatmap to reconfigure the heatmap.

3. The image processing system of claim 2, wherein the browsing engine is configured to generate the heatmap by connecting regions of the heatmap having a same indication and processing contour lines on the connected regions.

4. The image processing system of claim 2, wherein the browsing engine is configured to perform overlapping one of the image matching the search condition and the reconfigured heatmap on the other.

5. The image processing system of claim 3, wherein, if a point is selected on the reconfigured heatmap, the browsing engine is configured to provide a summarized image corresponding to the selected point.

6. The image processing system of claim 5, wherein the browsing engine is configured to display the reconfigured heatmap, the image matching the search condition and the summarized image on different regions of the screen.

7. An image processing system comprising:
   a heatmap generator, implemented by using at least one hardware processor, configured to divide a region of an image matching a search condition into predetermined units, calculate an amount of motions in divided regions from index data to establish priorities, allocate different indications according to the established priorities to generate a heatmap, and apply smoothing filtering to the heatmap to reconfigure the heatmap; and
   a display configured to display the reconfigured heatmap and the image matching the search condition,
   wherein the heatmap generator is further configured to classify objects included in the image, analyze motions or lines of movement of the objects, and perform cumulative hashing on a result of analyzing the motions of the objects per unit time, and wherein the index data are generated based on a result of the cumulative hashing.

8. The image processing system of claim 7, wherein the heatmap generator is configured to generate the heatmap by connecting regions of the heatmap having a same indication and process contour lines on the connected regions.

9. The image processing system of claim 7, wherein the heatmap generator comprises an overlapper, implemented by using the at least one hardware processor, configured to overlap one of the image matching the search condition and the reconfigured heatmap on the other.

10. The image processing system of 7, wherein the heatmap generator comprises: a summarized image generator, implemented by using the at least one hardware processor, if a point is selected on the reconfigured heatmap, configured to generate a summarized image corresponding to the selected point.

11. The image processing system of claim 10, wherein the display is configured to display the reconfigured heatmap, the image matching the search condition and the summarized image, on different regions of the screen.

12. An image processing method comprising:
analyzing an input image and generating metadata about the input image;
structuralizing and organizing the metadata and generating index data based on the metadata;
extracting index data matching a search condition and image data corresponding to the index data matching the search condition, from the input image; and
generating a heatmap based on the extracted index data and image data, and displaying the heatmap and an image matching the search condition on a screen,
wherein the analyzing comprises:
classifying objects included in the input image and analyzing motions or lines of movement of the objects; and
performing cumulative hashing on a result of analyzing motions of the objects per unit time.

13. The image processing method of claim 12, wherein the generating of the heatmap comprises:
dividing a region of an image matching a search condition into predetermined units;
calculating an amount of motions in the divided regions from index data to establish priorities;
allocating different indications according to the established priorities to generate a heatmap; and
applying smoothing filtering to the heatmap to reconfigure the heatmap.

14. The image processing method of claim 13, further comprising generating the heatmap by connecting regions of the heatmap having a same indication and processing contour lines on the connected regions.

15. The image processing method of claim 13, further comprising overlapping one of the image matching the search condition and the reconfigured heatmap on the other.

16. The image processing method of claim 13, further comprising, if a point is selected on the reconfigured heatmap, generating a summarized image corresponding to the selected point.

17. A non-transitory computer-readable recording medium having recorded thereon a computer program for executing an image processing method, the image processing method comprising:
analyzing an input image and generating metadata about the input image;
structuralizing and organizing the metadata and generating index data based on the metadata;
extracting index data matching a search condition and image data corresponding to the index data matching the search condition, from the input image; and
generating a heatmap based on the extracted index data and image data, and displaying the heatmap and an image matching the search condition on a screen,
wherein the analyzing comprises:
classifying objects included in the input image and analyzing motions or lines of movement of the objects; and
performing cumulative hashing on a result of analyzing motions of the objects per unit time.

* * * * *